United States Patent [19]

Hasegawa

[11] Patent Number: 4,633,524
[45] Date of Patent: Dec. 30, 1986

[54] GENERATION OF PULSES OF ELECTROMAGNETIC RADIATION BY USE OF THE INDUCED MODULATIONAL INSTABILITY

[75] Inventor: Akira Hasegawa, New Providence, N.J.

[73] Assignee: AT&T Bell Laboratories, Murray Hill, N.J.

[21] Appl. No.: 602,694

[22] Filed: Apr. 23, 1984

[51] Int. Cl.⁴ .............................................. H04B 9/00
[52] U.S. Cl. .................................... 455/612; 455/610
[58] Field of Search ............... 350/96.15, 96.16, 96.18; 455/610, 612, 619, 611

[56] References Cited

U.S. PATENT DOCUMENTS

| | | | |
|---|---|---|---|
| 4,054,366 | 10/1977 | Barnoski et al. | 350/96 |
| 4,255,017 | 3/1981 | Hasegawa | 350/96.29 |
| 4,261,639 | 4/1981 | Kogelnik et al. | 350/96.15 |
| 4,368,543 | 1/1983 | Hasegawa | 455/612 |
| 4,406,516 | 9/1983 | Hasegawa | 350/96.29 |

FOREIGN PATENT DOCUMENTS 2116391 9/1983 United Kingdom ................ 455/612

OTHER PUBLICATIONS

*Physical Review*, vol. 137 (6A), "Theory of Stimulated Brillouin and Raman Scattering", Y. R. Shen et al, pp. A1787–A1805 (1965).

*IEEE Transactions on Microwave Theory and Techniques*, vol. MTT-30, No. 8, "Waveguide Electrooptic Modulators", R. C. Alferness, pp. 1121–1137 (1982).

*Optics Letters*, vol. 7, No. 10, "Intensity Discrimination of Optical Pulses with Birefringent Fibers", R. H. Stolen et al, pp. 512–514 (1982).

*Optics Letters*, vol. 8, No. 12, "Amplification and Reshaping of Optical Solitons in a Glass Fiber-IV: Use of the Stimulated Raman Process", A. Hasegawa, pp. 650–652 (1983).

*IEEE Journal of Quantum Electronics*, vol. QE-16, No. 7, "Tunable Coherent IR and FIR Sources Utilizing Modulational Stability", pp. 694–697 (1980).

*Optics Letters*, vol. 8, No. 6, "Amplification and Reshaping of Optical Solitons in Glass Fiber-III, Amplifiers with Random Gain", Y. Kodama et al, pp. 342–344 (1983).

*Applied Physics Letters* 40(9), "Compression of Femtosecond Optical Pulses", C. V. Shank et al, pp. 761–763 (1982).

*Optics Letters*, vol. 9, "The Soliton Laser", L. F. Mollenauer et al, pp. 13–15 (1984).

*Primary Examiner*—Joseph A. Orsino, Jr.
*Attorney, Agent, or Firm*—Eugen E. Pacher

[57] ABSTRACT

Pulses of electromagnetic radiation having predetermined spacing between pulses can be generated by coupling amplitude modulated carrier radiation into an appropriate nonlinear transmission medium that has anomalous dispersion in some spectral region. The amplitude modulation is to be such that the amplitude has peaks with the predetermined spacing, and the carrier wavelength is to be in the anomalous dispersion region of the medium. Interaction between the medium and the radiation then results in contraction of the width of the amplitude peaks, which can result in formation of narrow pulses. A preferred transmission medium is monomode fiberguide, e.g., silica-based single mode optical fiber. In addition to the method for producing a sequence of pulses, a communication system using the inventive method is disclosed. Furthermore, a communication system comprising Raman amplification of the signal is disclosed.

24 Claims, 8 Drawing Figures

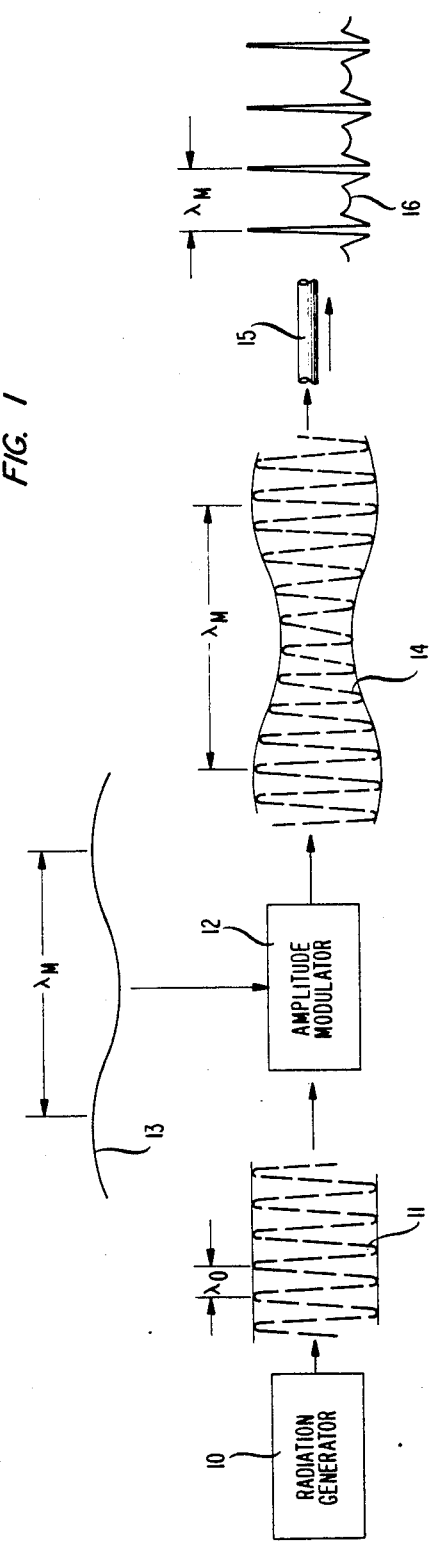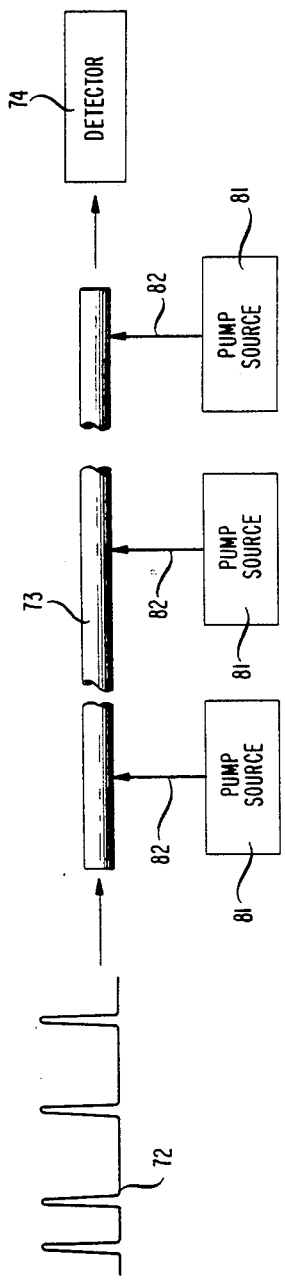

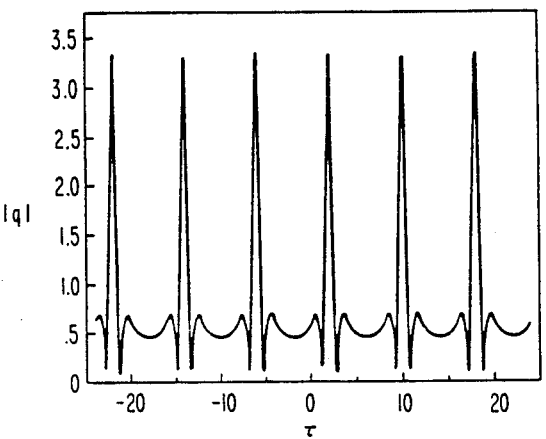
FIG. 5
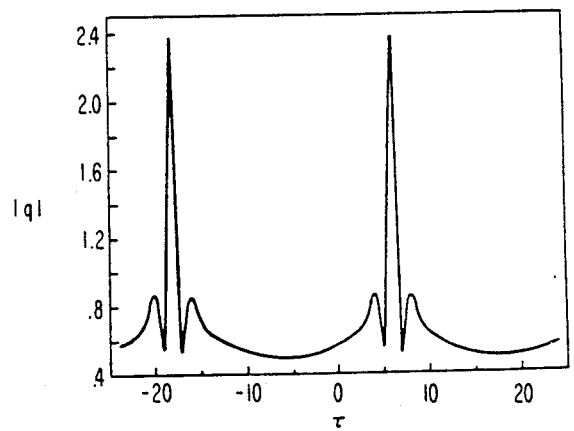
FIG. 6
FIG. 7
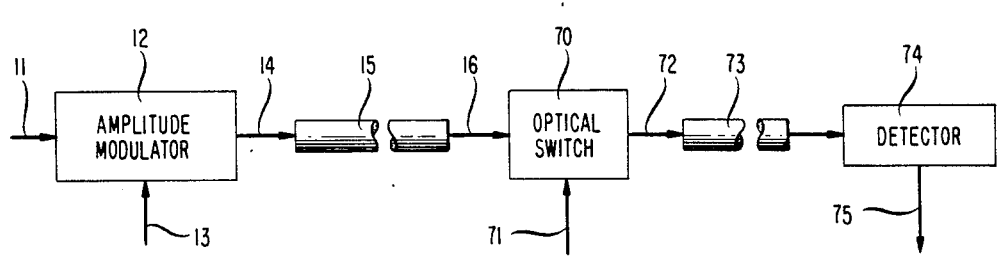

GENERATION OF PULSES OF ELECTROMAGNETIC RADIATION BY USE OF THE INDUCED MODULATIONAL INSTABILITY

FIELD OF THE INVENTION

This invention pertains to the generation of pulses of electromagnetic radiation, particularly in the optical and infrared spectral region, and to fiberguide communication systems using pulses generated by the inventive method.

BACKGROUND OF THE INVENTION

Pulses of electromagnetic radiation, typically in the visible or infrared part of the electromagnetic spectrum, find many uses in science and technology. For instance, almost all existing or planned optical communication systems are of the digital type and thus employ pulses of electromagnetic radiation. Other applications of such pulses are, inter alia, in optical radar, optical ranging, optoacoustic spectroscopy, and reaction rate studies.

The prior art knows many techniques for forming optical pulses, such as rotating chopper discs, pulsed lasers, diodes, or flash lamps. However, most older prior art techniques cannot conveniently and inexpensively produce a train of very short pulses, with pulse width of the order of one nanosecond or less.

Recently some methods have been developed that are capable of producing exceedingly short pulses, in the picosecond, and even femtosecond, range. These include pulse compression methods, (see, e.g., C. V. Shank et al, *Applied Physics Letters*, Vol. 40(9), pp. 761–763) and the solution laser method (L. F. Mollenauer et al, *Optics Letters*, Vol. 9, pp. 13–15). Such ultrashort pulses are of great scientific interest, since they permit previously unattainable time resolution in a number of scientific experiments. In addition to their scientific usefulness, such short pulses potentially may be useful in very high bit rate optical communication systems.

Such communication systems, which, it is believed, may be able to operate at bit rates of hundreds of gigabits/second, and even as high as a terabit/second, are based on the use of shape-preserving optical pulses, also referred to as optical solitons. See, for instance, U.S. Pat. No. 4,368,543, issued Jan. 11, 1983 to A. Hasegawa; U.S. Pat. No. 4,406,516, issued Sept. 27, 1983 to A. Hasegawa; and Y. Kodama and A. Hasegawa, *Optics Letters*, Vol. 8(6), pp. 342–344 (1983). The above patents are co-assigned with this.

Such systems, in order to approach the high data transmission rate of which they are capable, require means that can produce narrow optical pulses at a very high rate. This application discloses a relatively simple and inexpensive method for producing such pulses.

As will be discussed below in detail, the inventive method utilizes the modulational instability of continuous wave (cw) radiation in an appropriate optical medium. This instability has previously been used to produce tunable coherent infrared and far infrared electromagnetic radiation. See, U.S. Pat. No. 4,255,017, issued Mar. 10, 1981, to A. Hasegawa, co-assigned with this, and A. Hasegawa and W. F. Brinkman, *IEEE Journal of Quantum Electronics*, Vol. QE-16(7), pp. 694–697. The prior art method comprises injection of unmodulated cw radiation, the carrier, into single mode optical fiber, the carrier wavelength chosen to lie within the regime of anomalous dispersion of the fiber core material. Due to the combined effect of the anomalous dispersion and the nonlinear Kerr effect, side bands of the carrier are produced; in other words, amplitude modulation of the injected unmodulated carrier wave results. Rectification of the modulated carrier yields an output signal of a frequency proportional to the square root of the power in the carrier wave.

GLOSSARY OF TERMS

By "optical" radiation (and its equivalents) I mean radiation of a wavelength used, or potentially useful, in communication systems using fiberguide as transmission medium. Typically optical radiation is in the visible and infrared spectral region, from about 0.4 $\mu$m to about 100 $\mu$m wavelength.

"Radiation of nominal wavelength $\lambda_o$" is intended to mean "radiation having a finite (but narrow) spectral width, the spectrum approximately centered on $\lambda_o$".

The spacing between two pulses (or amplitude peaks) is the spacing between corresponding parts of the two pulses (or amplitude peaks) (e.g., peak-to-peak spacing) in vacuum, and can be expressed in terms of a length, e.g., $\lambda_M$, or in terms of a time, e.g., $\tau_M$, where $\tau_M = \lambda_M/c$, c being the speed of light in vacuum.

Amplitude modulation is the process by which the amplitude of a carrier wave (herein radiation of wavelength $\lambda_o$) is varied in accordance with some property (typically the amplitude) of a quantity, the modulating signal. The modulating signal can be, but need not be, sinusoidal, and can have, but need not have, substantially constant wavelength. Amplitude modulation of cw carrier radiation of substantially constant amplitude produces amplitude peaks in the carrier radiation.

The width of a radiation amplitude peak in a carrier herein is the width, in vacuum, at the half-maximum, i.e., halfway between minimum amplitude and maximum amplitude. Similarly, the width of a pulse is the width at half-maximum. Pulse width and width of a radiation amplitude peak can also be expressed in terms of length or in terms of time, and the two modes of expressing the above quantities (and of pulse spacing and amplitude peak spacing) are used interchangeably herein.

The modulation depth of an amplitude modulated carrier wave herein is one half of the difference between maximum and minimum carrier amplitude, divided by the average carrier amplitude.

A fiberguide is a dielectric filament having a refractive index profile such as to longitudinally guide electromagnetic radiation of the design wavelength $\lambda_o$. A monomode fiberguide is a fiberguide which can carry only one mode (the fundamental mode) of radiation at the design wavelength.

Transmission media useful for the practice of the invention have a region of anomalous dispersion, a nonlinear index of refraction, and are substantially transparent for radiation of wavelength $\lambda_o$. A medium is "substantially transparent" if $|\bar{q}|^2 > \Gamma$. For definitions of these terms, see the material following equation 1 below.

A transmission medium, having an (group velocity) index of refraction N (defined as $c/u_g$, where $u_g$ is the group speed) at the wavelength $\lambda$, has anomalous dispersion at $\lambda$ if $\partial N/\partial \omega < 0$ at $\lambda$ with $\omega$ the radial frequency of the radiation of wavelength $\lambda$. A fiberguide has a spectral region of anomalous dispersion if $\partial N/\partial \omega < 0$ over a finite range of wavelengths.

Silica-based fiberguide herein has a core and optically active cladding that everywhere comprises more than 50%, by weight, of $SiO_2$.

It is to be understood that all wavelengths herein refer to wavelength in vacuum.

SUMMARY OF THE INVENTION

I have invented a method for generating a sequence of pulses in electromagnetic radiation of nominal wavelength $\lambda_o$, typically a train of optical pulses. The pulse spacing can be essentially constant, or it can be varied, typically in accordance with some pre-established scheme. The method utilizes the modulational instability which can occur in any nonlinear transmission medium having an anomalous dispersion regime, combined with an (external) amplitude modulation of the carrier (of nominal wavelength $\lambda_o$).

The inventive method for producing a sequence of pulses of electromagnetic radiation, the sequence of pulses comprising at least two adjacent pulses with predetermined spacing therebetween, comprises coupling radiation of nominal wavelength $\lambda_o$ into an appropriate transmission medium, the medium having anomalous dispersion in a spectral region that comprises $\lambda_o$, the radiation propagating through the medium from the coupling location to an output location. The amplitude of the radiation coupled into the medium comprises a sequence of amplitude peaks, the spacing between two adjacent peaks being substantially equal to the predetermined spacing between the two pulses formed from the two peaks. The length of the propagation path in the transmission medium is such that the width of a pulse is at least 10% less than the width of the amplitude peak from which the pulse was formed. It is to be noted that amplitude peaks, after propagation through the transmission medium and undergoing contraction, are referred to herein as pulses.

Pulse production occurs through interaction of the electromagnetic radiation with the transmission medium. The nonlinearity of the medium produces self-steepening of the amplitude peaks, and the spacing between the (externally produced) amplitude peaks determines the spacing between the pulses formed from the peaks.

The invention has broad applicability, and can be practiced with any medium, e.g., a vapor, having the requisite anomalous dispersion and low absorption, as will be appreciated by those skilled in the art. However, the discussion herein will primarily be in terms of the preferred transmission medium, namely, monomode fiberguide, typically silica-based monomode fiberguide. This is merely to facilitate exposition and is not intended to limit the scope of the invention.

The inventive method can advantageously be applied in a high data rate communication system, e.g., a fiberguide system that uses soliton pulses. Such a system typically comprises, in addition to means for generating a sequence of radiation pulses by the inventive method, means for modifying the generated sequence of pulses in accordance with a predetermined scheme (e.g., by removal of pulses from the pulse train), means for coupling the modified pulse train into monomode fiberguide, and means for detecting radiation pulses after their transmittal through the fiber. A soliton communication system using Raman amplification is also disclosed.

BRIEF DESCRIPTION OF THE DRAWINGS

FIG. 1 schematically shows a system for producing pulses according to the invention;

FIGS. 2-6 show radiation envelopes;

FIG. 7 schematically shows a communication system according to the invention; and FIG. 8 depicts schematically a communication system that uses Raman amplification.

Identical or analogous features appearing in different figures are identified by the same reference numeral.

DETAILED DESCRIPTION

Figure 2:
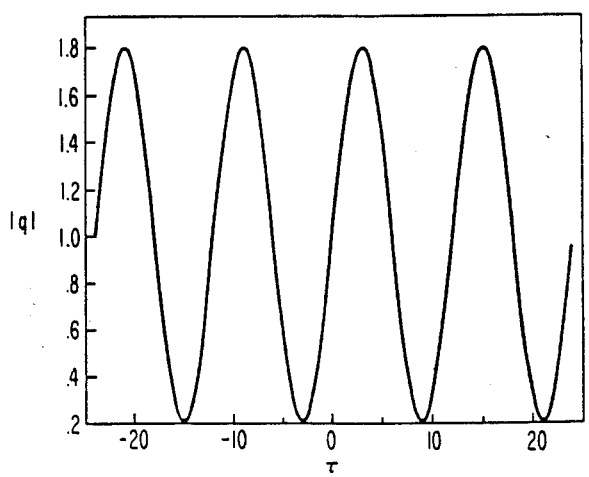

The theory that predicts the existence and properties of the instability of unmodulated cw electromagnetic radiation propagating through a single mode fiberguide has been outlined in U.S. Pat. No. 4,255,017 (the '017 patent), incorporated herein by reference, and will not be repeated here in any detail.

As has been shown before (e.g., the '017 patent) an essentially constant amplitude cw carrier wave can exhibit instability due to small random perturbations in amplitude of wavelength greater than a critical wavelength $\lambda_c$. For a carrier of the form given by Equation 1 of the '017 patent, $\lambda_c$ is, in the dimensionless units of the patent, equal to $\pi[10^{4.5}(\pi n_2)^{\frac{1}{2}}\Phi]^{-1}$, with all the symbols as defined in the patent. This instability leads, as I have taught previously, to the development of side bands of the carrier wave.

I have discovered that the same instability can be utilized to form a sequence of pulses having a predetermined spacing between adjacent pulses. More generally, the instability can be used to produce a narrowing of the amplitude maxima of amplitude modulated cw electromagnetic radiation of appropriate wavelength.

The method comprises coupling amplitude modulated cw radiation into an appropriate transmission medium, e.g., into a single mode fiberguide, of predetermined length. A necessary condition for the existence of the instability, and therefore for the practice of the invention, is the existence of a spectral region in which the medium has anomalous dispersion. The carrier wavelength $\lambda_o$ is then selected to be within the anomalous dispersion regime.

For a given fiber, radiation intensity and wavelength, modulation frequency and depth, the degree of narrowing typically is a function of the fiber length, increasing with increasing fiber length. However, as will be further discussed below, fully formed pulses can split into doublets, and perhaps even higher multiplets, in a fiber that is longer than the length required for development of a fully formed pulse.

An exemplary embodiment of the inventive method is schematically depicted in FIG. 1. Unmodulated cw radiation 11, of wavelength $\lambda_o$, is produced by radiation generator 10, and is amplitude modulated by means of amplitude modulator 12. The wavelength of the modulating signal 13 is $\lambda_M$. Although 13 is shown as a sinusoidal signal of constant wavelength and amplitude, it is not necessarily the case, and other, more complex, waveforms could, in principle, also be used to modulate the carrier. Amplitude modulated cw radiation 14 is then coupled into single mode optical fiberguide 15 and, after interaction with the fiber, emerges at the output end of the fiber as output radiation 16, with spacing between pulses equal to $\lambda_M$. The output radiation may also contain radiation that is not contracted into the pulses (or amplitude maxima), as indicated schematically in 16. This radiation will be referred to as the background, and will be further discussed below. For ease of representation, 16 does not show the individual waveforms of the carrier radiation, and is not drawn to the same scales as 14.

Any suitable means for effecting the amplitude modulation of the carrier wave is considered to be within the scope of the invention. For instance, the means can be a waveguide electrooptic modulator of a type discussed by R. C. Alferness in *IEEE Transactions on Microwave Theory and Techniques,* Vol. MTT-30(8), pp. 1121–1137, (1982). Means for generating radiation 10, means for coupling radiation into the amplitude modulator or into the fiberguide, attenuators, and other necessary components are well known to those skilled in the art and need no discussion here. For instance, a convenient source for the cw radiation might be a solid state laser emitting in the 1.5 μm wavelength range, e.g., a InGaAsP laser. Alternative to the above scheme which shows separate means for generating and for amplitude modulating the carrier wave, it is of course possible to combine these two functions in a single means, e.g., an amplitude modulated laser, and this and other obvious variations are intended to be within the scope of the invention.

Exemplary fiberguide useful in the practice of the inventive method is standard low loss silica-based single mode optical fiber of the type familiar to those skilled in the art. $SiO_2$ has a region of anomalous dispersion for wavelengths greater than about 1.3 μm, extending to wavelengths that are not of interest herein, due to strong radiation absorption at these wavelengths. Since doping of $SiO_2$ typically causes a shift of the lower limit of the anomalous dispersion region ($\lambda_d$ herein), in silica-based fiberguide $\lambda_d$ typically is larger than 1.3 μm. High purity silica has very low absorption at about 1.55 μm, and wavelength between about 1.3 μm and about 1.7 μm are therefore of considerable interest for communication purposes. If the wavelengths are also in the region of anomalous dispersion of silica-based fiberguide, e.g., fiberguide with germania doped core, they can be advantageously used to practice the invention.

I will now describe a computer simulation of pulse formation by the induced modulational instability. It is well established that the nonlinear Schrodinger equation describes accurately the space-time evolution of the complex envelope amplitude $\Phi(x, t)$ of electromagnetic radiation of wavelength $\lambda_o$ in single mode fiberguide. The equation can be written as follows:

$$i\frac{\partial q}{\partial \xi} + \tfrac{1}{2}\frac{\partial^2 q}{\partial \tau^2} + |q|^2 q = -i\Gamma q \tag{1}$$

where
$\xi = 10^{-9} x/\lambda$,
$\tau = 10^{4.5}(-\lambda k'')^{-\frac{1}{2}}(t - x/u_g)$
$q = 10^{4.5}(\pi n_2)^{\frac{1}{2}}\Phi$, and
$\Gamma = 10^9 \lambda \gamma$.

$\lambda$ is the wavelength of the carrier in free space (usually $\lambda_o$ herein), x is the distance of transmission in the fiberguide, $u_g$ is the group speed, t is the time, $n_2$ is the Kerr coefficient of the fiberguide material (about $1.2 \cdot 10^{-22}$ $m^2/V^2$ for $SiO_2$), $\Phi$ is defined above, $\gamma$ is the loss rate of the radiation in the fiber, $k' = \partial k/\partial \omega$, $k'' = \partial^2 k/\partial \omega^2$, and i is the imaginary unit.

Equation 1 is solved numerically in a periodic boundary condition, with period $\tau = 48$, with the initial condition $$q(0, \tau) = 1 + A_m \sin\left[\frac{2\pi\tau}{\tau_M}\right] \tag{2}$$

where $A_M$ is the depth of modulation ($0 < A_M \leq 1$), and $\tau_M$ is $\lambda_M/c$. The assumed value of $\lambda$ corresponds to a loss rate of 0.3 dB/km, and $\lambda$ is 1.55 μm. The fiber is assumed to have a core cross-section of 20 μm$^2$, the group dispersion, defined as ($\lambda_o k''$), is $8.52 \cdot 10^{-17}$ seconds for $\lambda_d$ of 1.50 μm. Then $|q| = 1$ corresponds to a power of 105 mW, $\tau = 1$ to 2.7 ps, and $\xi = 1$ to 1.55 km.

Figure 3:
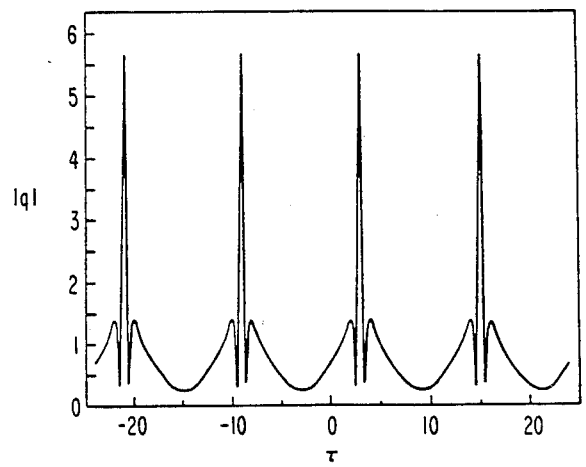
Figure 4:
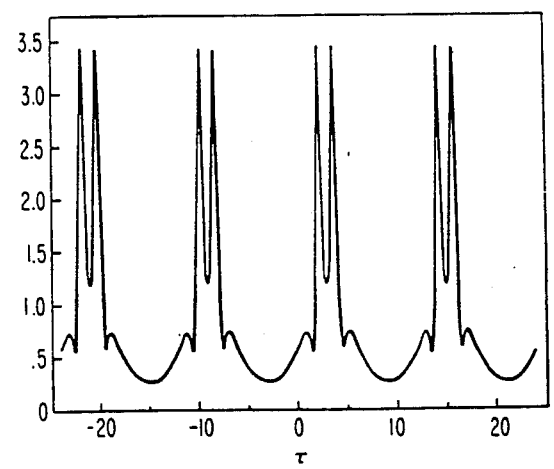

FIG. 2 shows the radiation envelope $|q|$ (modulation period $\tau_M = 32.4$ ps) at $\xi = 0$, and FIGS. 3 and 4 the computed envelope at $\xi = 1.29$ (2.0 km), and $\xi = 1.74$ (2.6 km), respectively. As can be seen, the amplitude maxima of the input radiation contract in width and increase in amplitude. The process can lead to formation of pulses whose amplitude approaches six times the initial average amplitude (=1). For longer propagation distances, however, the peaked structure can deform, splitting into two (or more) peaks, as is shown by FIG. 4. This and other calculations show that a pulse sequence, with pulse width $\tau_o \leq 1$, can be produced, the repetition period given by the modulation length $\lambda_M$, independent of the initial depth of modulation $A_M$. The calculations also show that the length of fiber needed to form fully developed pulses varies, inter alia, as a function of $A_M$ and $\tau_M$.

This is illustrated by FIGS. 5 and 6, which show the computed envelope structure at 2.5 km for $\tau_M$ of 21.5 ps, and at 10 km for $\tau_M$ of 64.8 ps, respectively. All other parameters are as given above. Table 1 shows further calculated results, namely, the distance $\xi_M$ at which the single peak structure is substantially fully developed, as well as the maximum $|q_M|$ and minimum $|q_m|$ radiation amplitude at that distance, for various values of modulation depth $A_M$ and modulation period $\tau_M$.

TABLE 1

|  |  | $\tau_M = 8$ | 12 | 24 |
|---|---|---|---|---|
| $A_M = 0.2$ | $\xi_M =$ | 2.90 | 3.55 | 6.45 |
|  | $\|q_M\| =$ | 2.5 | 2.4 | 2.4 |
|  | $\|q_m\| =$ | 0.6 | 0.7 | 0.7 |
| $A_M = 0.5$ | $\xi_M =$ | 1.61 | 1.94 | 3.23 |
|  | $\|q_M\| =$ | 3.4 | 3.9 | 3.8 |
|  | $\|q_m\| =$ | 0.5 | 0.7 | 0.8 |
| $A_M = 0.8$ | $\xi_M =$ | 1.08 | 1.29 | 2.26 |
|  | $\|q_M\| =$ | 4.4 | 5.7 | 4.7 |
|  | $\|q_m\| =$ | 0.5 | 0.8 | 1.2 |

The above values can, inter alia, be used to determine the results at different power levels, since Equation 1 is invariant if $q' = \alpha q$ is substituted, so long as the new variables $\tau' = \tau/\alpha$, $\xi' = \xi/\alpha^2$, and $\Gamma' = \alpha^2 \Gamma$ are used. If, for instance, the average power is increased by a factor of four, and the modulation period halved, the distance at which pulses are fully developed is quartered, in a fiber having quadrupled loss. I have also found that, generally, the pulse formation distance and the pulse width increase in proportion to the square root of the group dispersion at the carrier wavelength.

As can be seen from FIGS. 3–6, the radiation is typically not completely collapsed into pulses, but a cw background remains. If desired, this background radiation can be removed, for instance, by intensity discriminating means such as were disclosed by R. H. Stolen et al in *Optics Letters,* Vol. 7(10), pp. 512–514 (1982).

I have also found that, in order to avoid stimulated Brillouin backscattering in the fiberguide, it is advantageous to use input cw radiation having finite, although still relatively narrow, bandwidth. For instance, in silica-based fiber, the growth rate of the modulational instability exceeds that of the stimulated Brillouin scattering if the carrier bandwidth is greater than about 4 GHz.

As will be understood from the above discussion, the inventive method does not necessarily have to be used to form fully developed pulses. A parameter, e.g., the fiber length, can be chosen such that substantial narrowing of the amplitude peaks, typically by at least about 10%, probably at least about 50%, results. The modulation depth can be anywhere between 0 and 1, but preferably is greater than 0.5. The average amplitude of the radiation coupled into the fiberguide is to be such that at that point $|\bar{q}|^2 > \Gamma$, where the bar indicates the average value, and all other symbols were defined before. The minimum spacing between adjacent amplitude peaks is to be greater than about $10^9 \pi \lambda_o [10^{4.5}(\pi n_2)^{\frac{1}{2}} \Phi]^{-1}$.

The inventive method can advantageously be used in a communication system, e.g., a system using monomode fiberguide as transmission medium and soliton pulses as information carrier. Such systems may use silica-based fiberguide, and in that case preferably use a carrier wavelength $\lambda_o$ at or near 1.55 μm, but typically between about 1.3 and 1.7 μm. For the parameter values used in the examples herein, the pulse spacing $\lambda_M$ may typically be between about 1 mm ($3 \cdot 10^{-11}$ sec) and about 10 cm ($3 \cdot 10^{-9}$ sec). The pulse width typically is substantially less than the pulse spacing, preferably no more than about $0.25 \tau_M$, due to the possibility of interaction between adjacent soliton pulses.

A communication system according to the invention typically comprises, in addition to the inventive means for generating a sequence of pulses, described above, means for selectively modifying at least some of the pulses of the sequence of pulses, modification being in accordance with a predetermined scheme, whereby information can be impressed upon the pulse sequence. Such modification can be by any appropriate means, e.g., by means of a waveguide electrooptic modulator (see R. C. Alferness, op. cit.). However, modification is not necessarily by removal or attenuation of pulses, and the scope of the invention is intended to encompass all suitable modification means.

The modified pulse sequence is then coupled into the fiberguide by known means, transmitted therethrough, and detected by any appropriate means, at a location different from the input location.

A system according to the invention can be a soliton system or a nonsoliton system. In the former case, the transmission channel fiberguide has anomalous dispersion at $\lambda_o$. Furthermore, a soliton system advantageously comprises means for transforming the pulses generated by means of the inventive method into soliton pulses. Such means typically are attenuating means. In a nonsoliton system the transmission channel fiberguide is chosen to have normal dispersion at $\lambda_o$, or, advantageously, to have the wavelength of zero group dispersion at $\lambda_o$.

An exemplary communication system according to the invention is schematically depicted in FIG. 7. Reference numerals 11-16 refer to previously discussed pulse generating means. Pulse train 16 is modified in optical switch 70 in response to signal 71, modified pulse train 72 is coupled into optical fiber 73 and, after transmission therethrough, detected by detector 74, whose output 75 is available for processing by means not shown.

A system according to the invention may also comprise means for removing the background radiation, and means for amplifying the pulses in the fiber, in addition to such well-known components as coupling means, attenuators, switches, taps, and the like. An all-fiber system in which pulse formation, optical switching, and transmission all takes place in optical fiberguide is in principle possible and is considered to be within the scope of the invention. Furthermore, in principle the inventive method can be used to form a modulated pulse stream, i.e., a sequence of pulses carrying information, thereby obviating the need for separate pulse-modifying means. The modulation can be achieved by using an appropriately amplitude-modulated carrier, e.g., a carrier in which predetermined amplitude maxima are absent or shifted. In such an embodiment of the invention, the pulse-forming fiber could be directly joined to the pulse-transmitting fiber, or both functions could be achieved in the same fiber.

A particularly advantageous method for amplifying soliton pulses is by means of the stimulated Raman process, described, for instance, by A. Hasegawa in *Optics Letters*, Vol. 8(12), pp. 650-652 (1983), incorporated herein by reference. Raman amplification requires injection of cw (unmodulated) pump radiation into the fiberguide at an intermediate point along the fiber, and can lead, by means of a transfer of energy from the pump radiation to the pulses, to amplification and reshaping of the pulses. This is shown schematically in FIG. 8, where modified pulse train 72 is coupled into fiber 73, and radiation transmitted through the fiber is detected by detector 74. At one or, as shown, several, intermediate locations pump radiation 82, produced by pump sources 81, is injected into the fiberguide by means not shown, but known to those skilled in the art. See, for instance, U.S. Pat. No. 4,054,366, issued Oct. 18, 1977 to M. K. Barnoski et al.

The pump wavelength in a Raman amplifier is chosen to be different from the signal wavelength $\lambda_o$. In silica based fiberguide, for instance, the pump wavelength is advantageously chosen to be less than $\lambda_o$, typically by about 0.05-0.2 μm, preferably by about 0.1 μm. For a discussion of the theory of stimulated Raman scattering see, for instance, Y. R. Shen et al, *Physical Review*, Vol. 137, No. 6A, pp. A1787-A1805 (1965). Although it is possible to inject pump radiation so as to propagate in only one direction in the fiber, it is advantageous to inject it substantially symmetrically, i.e., such that pump radiation is propagating in both fiber directions, since this gives the possibility of amplifying signal pulses propagating in either direction. In a soliton system, it is advantageous to space the pump radiation injection points such that the pulses reach an injection point before they have ceased to be solitons, and to choose the system parameters such that amplification does maintain the pulses as fundamental solitons. I have found that advantageous distances between adjacent injection points are less than $2\pi$ in units of $\xi$ (see above). I have also found that it is advantageous to use pump radiation of finite bandwidth, in $SiO_2$-base fiber typically at least about 20 GHz, with a reasonable upper bandwidth limit in such fiber being about 200 GHz. The pump power typically can be in the range 3-100 mW, and in low loss fiber (e.g., 0.2 dB/km) a typical distance between injection points may be up to about 50 km, but may be considerably less for low pump power injection.

What is claimed is:

1. Method comprising producing a sequence of pulses of electromagnetic radiation of nominal wavelength $\lambda_o$, the sequence of pulses comprising a first pulse and a second pulse, the second pulse having a width and a predetermined spacing from the first pulse, with no pulse between the first and the second pulse, the method comprising
   (i) coupling, at a coupling location, radiation of nominal wavelength $\lambda_o$ into a transmission medium, the transmission medium having anomalous dispersion in a spectral region, the radiation propagating through the transmission medium from the coupling location to an output location, the length of propagation in the medium to be termed the length of the medium, the method characterized in that
   (ii) $\lambda_o$ is a wavelength in the spectral region of anomalous dispersion of the transmission medium, and the radiation is amplitude modulated cw radiation,
   (iii) the amplitude of the radiation coupled into the transmission medium comprises a sequence of amplitude peaks, the sequence of amplitude peaks comprising a first peak and, spaced therefrom and having a width, a second peak, with no peak between the first and the second peak, the spacing between the first and the second peak being substantially equal to the predetermined spacing between the first and the second pulse, the first and the second peak, after propagation through the transmission medium being termed the first and the second pulse, respectively, and
   (iv) the length of the medium is such that the width of the second pulse is at least 10% less than the width of the second peak.

2. Method of claim 1, wherein the average amplitude of the radiation coupled into the medium is such that $|\bar{q}|^2 > \Gamma$, where $|\bar{q}| = 10^{4.5}(\pi n_2)^{\frac{1}{2}}|\bar{\Phi}|$, and $\Gamma = 10^9 \lambda_o \gamma$, with $n_2$ being the Kerr coefficient of the medium, $\bar{\Phi}$ the average complex envelope amplitude of the radiation coupled into the medium, and $\gamma$ is the loss rate of the radiation in the medium.

3. Method of claim 1, wherein the spacing between the first and the second peak is greater than about $10^9 \pi \lambda_o [10^{4.5}(\pi n_2)^{\frac{1}{2}} \bar{\Phi}]^{-1}$.

4. Method of claim 1, wherein the transmission medium is monomode fiberguide.

5. Method of claim 4, wherein the sequence of peaks contains N peaks, with N>2, and wherein the peaks in the sequence of peaks have substantially constant spacing $\lambda_M$.

6. Method of claim 5, wherein the length of the medium is such that the width of the second pulse is at most $0.25\lambda_M$.

7. Method of claim 6, wherein the length of the fiberguide is such that the second pulse, at the output location, is substantially unsplit.

8. Method of claim 6, further comprising separating the radiation pulses from a background radiation of nominal wavelength $\lambda_o$.

9. Method of claim 8, wherein the pulses are separated from the background by introducing the radiation, after transmission through the fiberguide, into intensity discriminating means.

10. Method of claim 4, wherein the radiation of nominal wavelength $\lambda_o$ has a spectral width of at least about 4 GHz.

11. Method of claim 4, wherein the monomode fiberguide is silica-based monomode fiberguide.

12. Method of claim 11, wherein $\lambda_o$ is between about 1.3 μm and about 1.7 μm.

13. Method of claim 4, wherein $\lambda_M$ is between about 1 mm and about 10 cm.

14. Communication system comprising
   (a) means for producing a sequence of pulses of electromagnetic radiation of nominal wavelength $\lambda_o$, the sequence of pulses containing a first and a second pulse, the second pulse having a width and a predetermined spacing from the first pulse, with no pulse between the first and the second pulse,
   (b) means for coupling the sequence of pulses into a first monomode fiberguide at a first fiberguide location, and
   (c) means for detecting, at a second fiberguide location spaced from the first location, radiation of nominal wavelength $\lambda_o$ transmitted through the first fiberguide from the first fiberguide location, characterized in that
   the means for producing the sequence of pulses comprise
   (d) means for producing amplitude modulated cw electromagnetic radiation of nominal wavelength $\lambda_o$ having an amplitude comprising a sequence of amplitude peak, the sequence of peaks comprising a first peak and, spaced therefrom and having a width, a second peak, with no peak between the first and the second peak, the spacing between the first and the second peaks being substantially equal to the predetermined spacing between the first pulse and the second pulse,
   (e) means for coupling, at a coupling location, the radiation of nominal wavelength $\lambda_o$ produced in (d) into a second monomode fiberguide of predetermined length, the radiation propagating through the length of the fiberguide to an output location, the second fiberguide having anomalous dispersion in a spectral region, the first and the second peak, after propagation through the length of the fiberguide being termed the first and the second pulse, respectively
   the communication system further characterized in that
   (f) $\lambda_o$ is a wavelength in the spectral region of anomalous dispersion of the second fiberguide, and
   (g) the length of the second fiberguide is such that the width of the second pulse is at least 10% less than the width of the second peak.

15. System of claim 14, wherein the first monomode fiberguide is a fiberguide that is separate and distinct from the second monomode fiberguide, and the system further comprises means for modifying, in accordance with a preselected scheme, at least some of the pulses of the sequence of pulses to be coupled into the first monomode fiberguide at the first fiberguide location.

16. System of claim 15, further comprising means for removing, prior to coupling the sequence of pulses into the first monomode fiberguide at the first fiberguide location, at least a part of a background radiation from the sequence of pulses.

17. System of claim 15, wherein the first monomode fiberguide has a spectral region of anomalous dispersion, with $\lambda_o$ being a wavelength in the anomalous dispersion region of the first fiberguide.

18. System of claim 17, comprising means for amplifying the pulses of the modified sequence of pulses coupled into the first fiberguide.

19. System of claim 18, wherein the amplifying means comprise means located intermediate the first and the second fiberguide locations, and spaced from the first and the second fiberguide locations.

20. System of claim 19, wherein the intermediately located amplifying means comprise means for coupling substantially constant amplitude electromagnetic pump radiation of wavelength $\lambda_p$ into the first fiberguide, $\lambda_p$ being different from $\lambda_o$.

21. System of claim 15, wherein the fiberguide is silica-based fiberguide.

22. System of claim 21, wherein the radiation of wavelength $\lambda_o$ has a bandwidth of at least about 4 GHz.

23. System of claim 20, wherein $\lambda_p$ differs from $\lambda_o$ by between about 0.05 μm and about 0.2 μm, and the fiberguide is silica-based fiberguide.

24. System according to claim 23, wherein the pump radiation has a bandwidth between about 20 GHz and about 200 GHz.

* * * * *